United States Patent [19]
Cilluffo

[11] Patent Number: 6,078,160
[45] Date of Patent: *Jun. 20, 2000

[54] BIDIRECTIONAL DC MOTOR CONTROL CIRCUIT INCLUDING OVERCURRENT PROTECTION PTC DEVICE AND RELAY

[76] Inventor: Anthony Cilluffo, 2934 Eagle Ct., Rochester Hills, Mich. 48309

[*] Notice: This patent issued on a continued prosecution application filed under 37 CFR 1.53(d), and is subject to the twenty year patent term provisions of 35 U.S.C. 154(a)(2).

[21] Appl. No.: 09/197,267

[22] Filed: Nov. 20, 1998

Related U.S. Application Data

[63] Continuation of application No. 08/961,593, Oct. 31, 1997, abandoned.

[51] Int. Cl.[7] .................................................. G05D 23/00
[52] U.S. Cl. .............................. 318/641; 361/106; 361/31
[58] Field of Search ........................... 307/9, 10.1–10.3, 307/116, 117; 318/280–286, 461–472, 434; 388/903, 907; 361/23, 25, 27, 30, 31, 105, 106

[56] References Cited

U.S. PATENT DOCUMENTS

| | | | |
|---|---|---|---|
| 3,935,511 | 1/1976 | Boulanger et al. | 361/58 |
| 4,234,904 | 11/1980 | Fahlesson | 361/165 |
| 4,237,441 | 12/1980 | van Konynenburg et al. | 338/22 R |
| 4,238,812 | 12/1980 | Middleman et al. | 361/106 |
| 4,315,237 | 2/1982 | Middleman et al. | 338/22 R |
| 4,317,027 | 2/1982 | Middleman et al. | 219/553 |
| 4,426,633 | 1/1984 | Taylor | 338/25 |
| 4,545,926 | 10/1985 | Fouts et al. | 252/511 |
| 4,678,975 | 7/1987 | Vrabel et al. | 318/266 |
| 4,689,475 | 8/1987 | Matthiesen | 219/553 |
| 4,724,417 | 2/1988 | Au et al. | 338/22 R |
| 4,774,024 | 9/1988 | Deep et al. | 252/511 |
| 4,780,598 | 10/1988 | Fahey et al. | 219/511 |
| 4,800,253 | 1/1989 | Kleiner et al. | 219/553 |
| 4,845,838 | 7/1989 | Jacobs et al. | 29/671 |
| 4,847,719 | 7/1989 | Cook et al. | 361/13 |
| 4,857,880 | 8/1989 | Au et al. | 338/22 R |
| 4,859,836 | 8/1989 | Lunk et al. | 219/548 |
| 4,907,340 | 3/1990 | Fang et al. | 29/610.1 |
| 4,924,074 | 5/1990 | Fang et al. | 219/548 |
| 4,935,156 | 6/1990 | van Konynenburg et al. | 219/553 |
| 4,967,176 | 10/1990 | Horsma et al. | 338/22 R |
| 4,983,897 | 1/1991 | Tennant | 318/287 |
| 5,049,850 | 9/1991 | Evans | 338/22 R |
| 5,089,801 | 2/1992 | Chan et al. | 338/22 R |
| 5,229,695 | 7/1993 | Tsuda et al. | 318/434 |
| 5,296,996 | 3/1994 | Hansson et al. | 361/24 |
| 5,378,407 | 1/1985 | Chandler et al. | 252/513 |
| 5,689,395 | 11/1997 | Duffy et al. | 361/93 |
| 5,737,160 | 4/1998 | Duffy | 361/3 |
| 5,737,161 | 4/1998 | Thomas | 361/17 |
| 5,745,322 | 4/1998 | Duffy et al. | 361/45 |
| 5,864,458 | 1/1999 | Duffy et al. | 361/93 |

Primary Examiner—Jonathan Salata

[57] ABSTRACT

A system for controlling electric motors in binary and hybrid applications, particularly motors which are used to control windows which can be moved downwards from one extreme position to another extreme position by a single touch of the switch, and between other positions by depressing the switch so long as movement is desired. In this system, a control element is placed in series with the electric motor. The control element has an interrupt component and a sense component which are coupled in series, and the series combination is coupled in parallel with a control component. When the electric motor reaches one of its extreme positions, the sense component senses an increase in the current drawn by the motor. The sense component then signals the control component to cause the interrupt component to interrupt the current and stop the motor. In one embodiment of this system, the sense component is a PTC device, the control component is a relay coil, and the interrupt component is a set of relay contacts coupled with the relay coil.

13 Claims, 6 Drawing Sheets

BIDIRECTIONAL DC MOTOR CONTROL CIRCUIT INCLUDING OVERCURRENT PROTECTION PTC DEVICE AND RELAY

RELATED APPLICATIONS

This is a continuation of U.S. patent application Ser. No. 08/961,593 filed on Oct. 31, 1997, now abandoned.

This application is related to copending, commonly assigned U.S. patent application Ser. No. 08/564,831, now U.S. Pat. No. 5,689,395, the disclosure of which is incorporated herein by reference for all purposes.

BACKGROUND OF THE INVENTION

1. Field of the Invention

This invention relates to circuit arrangements for controlling electric motors.

2. Introduction to the Invention

Electric motors are used in numerous applications to rotate, translate or otherwise control the position or orientation of the objects being so controlled. For example, in automobiles, electric motors are used to control the position or orientation, or both, of windows, mirrors, mirror assemblies, seats, convertible tops, antennas and headlights, to name just a few.

Similar to the distinction between analog and digital in the context of electrical signals, computers, and the like, such applications of electric motors may be viewed as having analog and digital functions. For example, in some applications, e.g. power seats and mirrors, the object being positioned can be moved to rest at any desired position within two extremes. Such applications may be viewed as analog applications. Seats may be moved as desired between a full forward and a full rearward position, between a full downward position and a full upward position and/or between a full tilt forward position and a full tilt backward position. Similarly, power mirrors may be rotated between limits about one or more axes.

In other applications, e.g. headlights and mirror assemblies, the object being positioned can be moved to rest at one of two extremes. Such applications may be viewed as digital, or, more accurately, binary applications. Binary, because they rest in one of two possible states. Headlights may be rotated to a fully visible position when the lights are to be turned on, or the headlights may be rotated to a fully hidden position when the lights are to the turned off. A mirror assembly may be rotated to a full inward position, e.g. to facilitate parking in close quarters, or the mirror assembly may be rotated to a full outward position when the automobile is to be driven.

In this context of analog and binary position control, power windows are a hybrid. Power windows may be moved up or down, stopping at any desired position between a full upward position and a full downward position. In addition, the "one touch down" feature available with modern power windows permits the driver to cause the window to move to a full downward position with just a momentary flick of a switch. Hence, a hybrid system combines features of both analog and binary systems. Although power window applications are typically configured to apply the one touch feature in only one direction (and therefore may be thought of as a combination of analog and binary features), other hybrid applications may combine analog control with one touch control in two directions. Therefore, as used herein, hybrid systems include applications which combine analog control with one touch control in one or two directions.

Motorized position control systems which operate in a binary or hybrid mode are configured to automatically stop at the extreme positions. In order to be able to automatically stop, such motorized position control systems need a means to detect that the object being positioned, e.g. window, mirror assembly, antenna, etc., has reached the extreme position, and then to interrupt current to the actuating motor.

As used herein, interrupting current is meant to include applications in which current is totally disconnected in order to stop a motor, and applications in which current is substantially reduced, but not totally disconnected, in order to stop a motor.

Systems implemented to control motors in binary and hybrid applications tend to be complex and expensive, and, because of their complexity, can become unreliable. With respect to one touch down power windows, one known approach employs a small resistive element to monitor current flow with an operational amplifier circuit or custom semiconductor device arranged to detect the voltage across the resistive element. Upon detection of the voltage exceeding a threshold corresponding to the motor stall current, the circuit interrupts current to the motor. Such circuits may not be temperature compensated, and may possibly result in either nuisance stopping, i.e. stopping before the window is completely open, or in failing to stop the motor. To protect from the latter case, and prevent burning the motor, such systems may include a back-up timing circuit to interrupt current to the motor in a predetermined time if the current has not otherwise already been interrupted.

As used herein, the terms "binary application" and "binary mode" are interpreted to have a common meaning and are interchangeable as may be appropriate in the context used. Likewise, the terms "hybrid application" and "hybrid mode" are also interpreted to have a common meaning and are interchangeable as may be appropriate in the context used.

U.S. Pat. No. 4,678,975 (Vrabel et al.) discloses a control system for a reversible D.C. window drive motor that allows for one touch operations of the motor to lower the associated window.

Copending, commonly assigned U.S. patent application Ser. No. 08/564,465, now U.S. Pat. No. 5,864,458, discloses useful electrical protection systems which can be produced by connecting a PTC element in series with a mechanical switch or other circuit interruption element, and by connecting a bypass element in parallel with the PTC element and the circuit interruption element. When an overcurrent passes through such a system, the PTC element increases in resistance, and as a result an increased current passes through the bypass element. The bypass element is functionally linked to the circuit interruption element so that the increased current through the bypass element converts the circuit interruption element into its fault state.

PTC circuit protection devices are well known. The device is placed in series with a load, and under normal operating conditions is in a low temperature, low resistance state. However, if the current through the PTC device increases excessively, and/or the ambient temperature around the PTC device increases excessively, and/or the normal operating current is maintained for more than the normal operating time, then the PTC device will be "tripped," i.e. converted to a high temperature, high resistance state such that the current is reduced substantially. Generally, the PTC device will remain in the tripped state, even if the current and/or temperature return to their normal levels, until the PTC device has been disconnected from the power source and allowed to cool. Particularly useful PTC devices contain a PTC element which is composed of a PTC conductive polymer, i.e. a composition which comprises (1) an organic polymer, and (2) dispersed, or otherwise distributed, in the polymer, a particulate conductive filler, preferably carbon black. PTC conductive polymers and devices containing them are described, for example in U.S. Pat. Nos. 4,237,441, 4,238,812, 4,315,237, 4,317,027, 4,426,633, 4,545,926, 4,689,475, 4,724,417, 4,774,024, 4,780,598, 4,800,253, 4,845,838, 4,857,880, 4,859,836, 4,907,340, 4,924,074, 4,935,156, 4,967,176, 5,049,850, 5,089,801 and 5,378,407, the disclosures of which are incorporated herein by reference for all purposes.

While PTC devices are commonly placed in series with a load to act as a "resettable fuse," the non linear characteristics of a PTC device make it useful in circuit arrangements in which the PTC device may be used, for example, as a current sensor, and act in coordination with other circuit devices to control the state of the circuit.

SUMMARY OF THE INVENTION

I have invented a new system for controlling electric motors in binary and hybrid applications. In one arrangement of the new system, a control element is placed in series with the electric motor. The control element comprises an interrupt component and a sense component coupled in series, with the series combination coupled in parallel with a control component. When the electric motor, preferably a reversable-rotation D.C. drive motor, reaches one of its extreme rotational positions, the sense component senses an increase in the current drawn by the motor. The sense component then signals the control component to cause the interrupt component to interrupt the current and stop the motor. In one embodiment of an arrangement of the invention, the sense component is a PTC device, the control component is a relay coil, and the interrupt component is a set of relay contacts coupled with the relay coil. When the motor reaches either a full forward rotational position or a full reverse rotational position, the motor typically stalls, causing the current drawn by the motor to increase to a level above the motor's rotational current. This increased current causes the PTC device to trip from a low resistance state to a high resistance state and results in an increased voltage across the PTC device. The relay coil is arranged in parallel with a series arrangement of the PTC device and the set of relay contacts. Therefore, the increased voltage across the PTC device is applied directly across the relay coil. When the voltage increases to a relay actuation voltage, the relay coil opens the set of relay contacts and thereby interrupts all further current flow through the PTC device and the motor. The relay remains actuated until a power switch is opened, whereupon the relay coil returns the set of relay contacts to the closed position in series with the PTC device.

BRIEF DESCRIPTION OF THE DRAWINGS

The invention is illustrated in the accompanying drawings, in which like components are given the same reference numerals in each FIG. in which they appear, and in which.

In the block diagrams shown in FIGS. 1, 3, 5, 7, 9, 11 and 13, an input to and/or and output from an operational element may represent multiple inputs to and/or outputs from the corresponding circuit component(s) shown in FIGS. 2, 4, 6, 8, 10, 12 and 14, respectively.

DETAILED DESCRIPTION OF THE INVENTION

Figure 1:
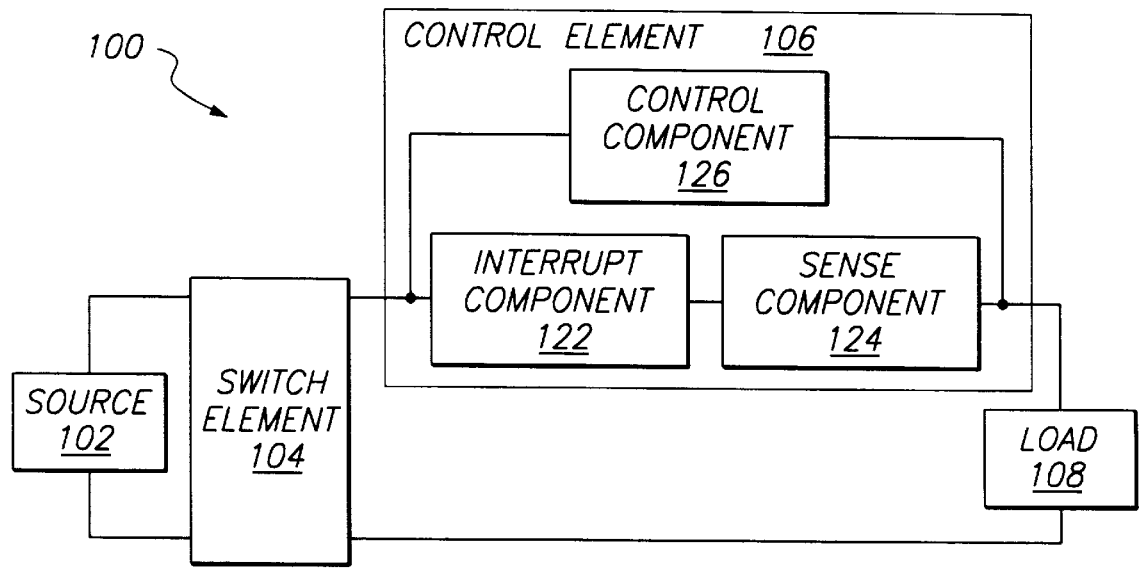
FIGS. 1 and 3 show block diagrams depicting two embodiments of the operational elements of electric circuits suitable for controlling an electric motor in a binary application according to a first aspect of the invention.

FIG. 1 is a block diagram of a first embodiment of a motor control circuit 100 suitable for controlling a motor operating in a binary mode, according to the first aspect of the invention. The blocks in the block diagram represent operational elements which comprise the circuit and perform the circuit functions.

The operational elements in the circuit 100 include a source 102, a switch element 104, a control element 106 and a load 108. The source 102, e.g. battery, power supply, etc., provides electrical energy to the circuit 100. The load 108 performs the intended function of the circuit 100. In the instance of this invention, the load 108 is typically a reversible DC motor. As described herein, the source 102 shall be referred to as having a positive terminal and a negative terminal (illustrated in FIGS. 2, 4, 6, 8, 10, 12 and 14), and the load 108 shall be referred to as having a positive terminal and a negative terminal (illustrated in FIGS. 2, 4, 6, 8, 10, 12 and 14). The load 108 shall be referred to as rotating: (1) in a positive direction when the positive terminal is coupled to the positive terminal of the source 102 and the negative terminal is coupled to the negative terminal of the source 102 (such connection referred to herein as positive polarity); and (2) in a negative direction when the positive terminal is coupled to the negative terminal of the source 102 and the negative terminal is coupled to a positive terminal of the source 102 (such connection referred to herein as negative polarity).

The switch element 104 performs the related functions of coupling the source 102 to the load 108 and controlling the polarity of that connection. The control element 106 automatically interrupts current to the load 108 at the proper time. In the embodiment depicted in FIG. 1, the control element 106 is coupled in series in a line coupling (via the switch element 104) the source 102 and the load 108. Three components in the control element 106 cooperate to perform the automatic disconnect function. A sense component 124 senses when the current to the load 108 should be interrupted. The sense component 124 communicates with a control component 126, and the control component 126 controls the state of an interrupt component 122. The control component 126 causes the interrupt to component 122 to interrupt the current to the load 108. In the embodiment depicted in FIG. 1, the interrupt component 122 and the sense component 124 are coupled in series, with the series combination coupled in parallel with the control component 126.

In the examples of embodiments of motor control circuits arranged in accordance with aspects of the invention, various switches and sets of relay contacts may be depicted in a single-pole single-throw configuration, or in a single-pole double-throw configuration with only one of the double-throw terminals being used in the circuit. Also, switch assemblies may be depicted as comprising one, two or three sets of switches, and relay assemblies may be depicted as comprising one or two sets of contacts. Such depiction is not intended to in any way limit the respective examples to the specific configurations of switches and relays so depicted. Moreover, all switches and relay contacts are depicted in the FIGs. in their respective normally closed, de-energized positions. References herein to the switches and/or relay contacts being "activated" shall mean that the referenced switch or relay contacts are moved to the normally open position. Moreover, references herein to the switches and/or relay contacts being "de-activated" shall mean the referenced switch or relay contacts are moved from the normally open position to the normally closed position.

Figure 2:
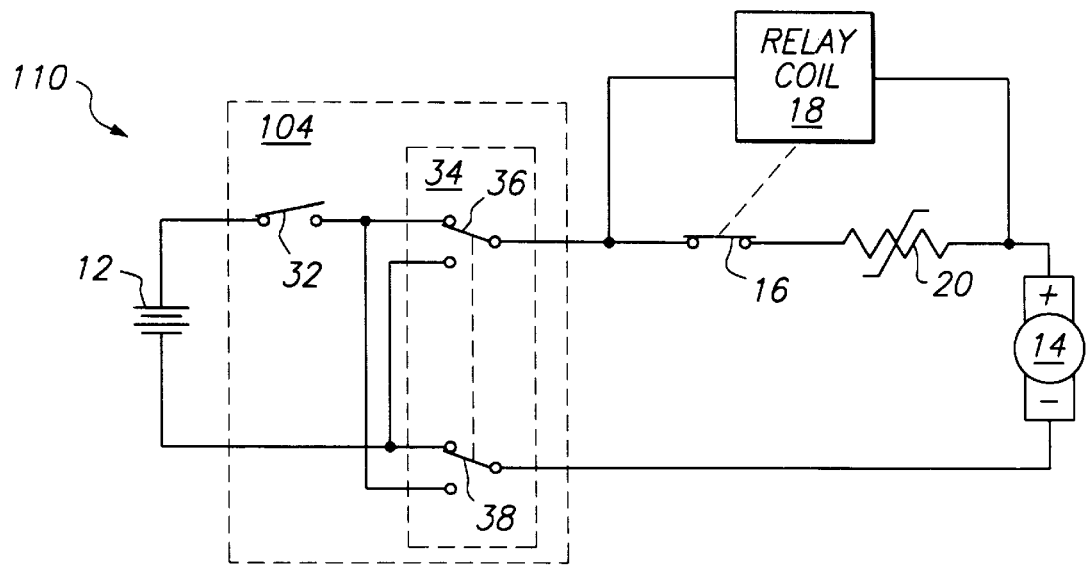
FIGS. 2 and 4 show diagrams of example circuits corresponding to the block diagrams of FIGS. 1 and 3, respectively, suitable for controlling an electric motor in a binary application according to a first aspect of the invention.

FIG. 2 is a circuit diagram of an example of an embodiment of a first motor control circuit 110 suitable for controlling a motor operating in a binary mode, according to the first aspect of the invention. Table 1 shows a correspondence between the operational elements of the embodiment shown in FIG. 1 and the circuit devices shown in FIG. 2. The first and second columns list the operational elements and their corresponding reference numerals. The third and fourth columns break down the control element 106 into its constituent components and their corresponding reference numerals. The fifth and sixth columns list the circuit devices and their corresponding reference numerals.

TABLE 1

| Operational Element | | | | Circuit Device | |
|---|---|---|---|---|---|
| Source | 102 | | | Battery | 12 |
| Switch Element | 104 | | | Power Switch | 32 |
| | | | | Rocker Switch | 34 |
| Control Element | 106 | Interrupt Component | 122 | Relay Contacts | 16 |
| | | Sense Component | 124 | PTC | 20 |
| | | Control Component | 126 | Relay Coil | 18 |
| Load | 108 | | | Motor | 14 |

A battery 12 provides power to a reversible DC motor 14. A power switch 32 is closed to apply power to the first circuit 110 and open to remove power from the first circuit 110. A rocker switch 34 is a mechanically linked, mutually inclusive, double pole double throw rocker switch comprising a first set of contacts 36 and a second set of contacts 38. Both sets of contacts 36, 38 are depicted in the normally closed position. The large dashed box indicates the components in the first circuit 110 comprising the switch element 104.

In the normally closed position, the rocker switch 34 couples the battery 12 to the motor with a positive polarity, i.e. with the motor 14 coupled to rotate in the positive direction. Coupled between the rocker switch 34 and the motor 14 is a set of relay contacts 16 and a PTC 20 coupled in series with the series combination coupled in parallel with a relay coil 18. The relay coil 18 controls the state of the relay contacts 16. The relay contacts 16 are shown in the normally closed position with the relay coil 18 de-energized.

Moving the rocker switch 34 from the normally closed position to the normally open position will reverse the polarity to the motor 14. Movement of the rocker switch 34 from either the normally closed position (positive polarity) or the normally open position (negative polarity), will cause the motor 14 to rotate until the motor 14, or the assembly to which it is coupled, reaches a mechanical stop (not illustrated in any of the FIGs.). This will cause the motor 14 to "stall." The current drawn by a stalled motor 14 is referred to as "stall current." The stall current will typically be more than twice the normal current drawn by the motor 14.

The resistance of the PTC 20 is significantly less than that of the relay coil 18. Thus, substantially all of the current drawn by the motor 14 passes through the PTC 20. When the motor 14 reaches the mechanical stop and becomes stalled, the stall current flow through the PTC 20 causes the PTC 20 to heat and increase in resistance. As the PTC 20 increases in resistance, the voltage across the PTC 20 and relay coil 18 increases. The resistance of the PTC 20 continues to increase until the voltage across the PTC 20 and relay coil 18 reaches the "pull in" voltage of the relay coil 18, causing the relay coil 18 to energize. When the relay coil 18 energizes, the normally closed relay contacts 16 open, thereby interrupting the current flow through the PTC 20. A trickle current will continue to flow through the relay coil 18 and through the windings of the motor 14. The resistance of the relay coil 18 is more than an order of magnitude greater than the resistance of the motor 14 windings. Therefore, the voltage across the relay coil 18 approximates the battery 12 voltage, and keeps the relay coil 18 energized. As long as the battery 12 is coupled via switch 32, the relay coil 18 will stay energized. If the state of the rocker switch 34 is changed while the battery 12 is coupled, a "break before make" feature of the rocker switch 34 causes the relay coil 18 to de-energize and close the relay contacts 16. With the PTC 20 cool and in its low resistance state, the motor 14 will commence to move (in either the positive or negative direction) toward the opposite extreme and the sequence will repeat as described above. When the battery 12 is disconnected, the relay coil 18 de-energizes. However, when the battery 12 is reconnected, motor 14 movement will only occur if the state of the rocker switch 34 has changed while the battery 12 was disconnected.

In the embodiment depicted in FIGS. 1 and 2, when the interrupt component 126 interrupts current to the load 108, there is still a path by which current may flow, although greatly reduced, via the control component 126, i.e. the relay coil 18. In some applications it may not be feasible to provide a power switch 32 to remove power altogether. Therefore, in some applications it may be desirable to provide a means to further reduce the current flow through the relay coil 18 and the motor 14 when the relay coil 18 is energized and the relay contacts 16 are open.

Figure 3:
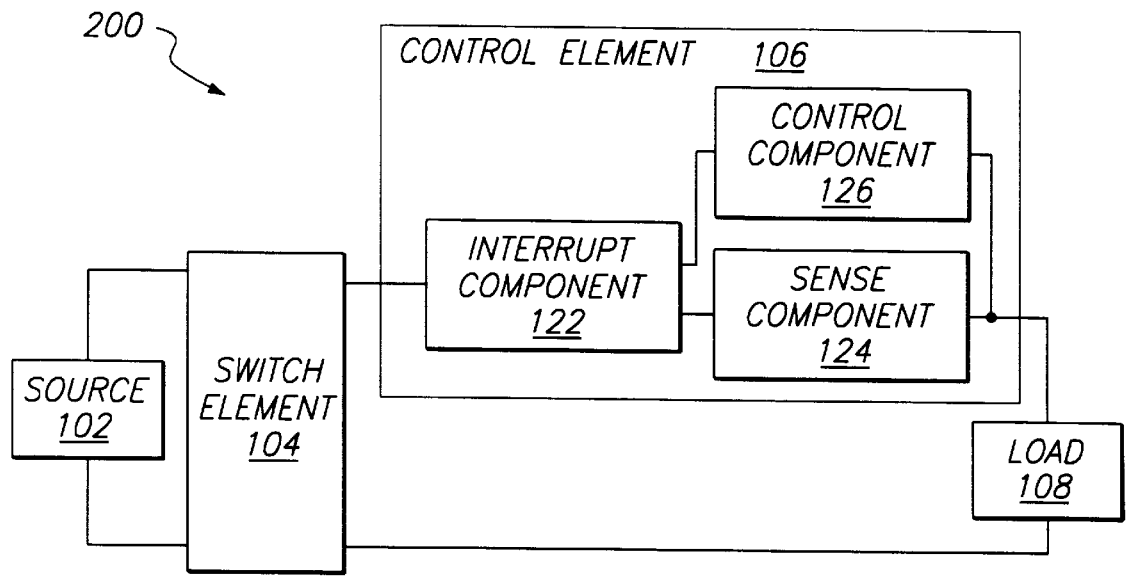

FIG. 3 is a block diagram of a second embodiment of a motor control circuit 200 suitable for controlling a motor operating in a binary mode according to the first aspect of the invention. The block diagram in FIG. 3 is similar to that shown in FIG. 1. However, whereas in FIG. 1 the interrupt component 122 is coupled in series with the sense component 124, in FIG. 3, the interrupt component 122 has a first output coupled to the sense component 124 and a second output coupled to the control component 126. The coupling between the interrupt component 122 and the control component 126 provides a means to increase the impedance in the current path when the interrupt component 122 operates to interrupt current in the circuit 200.

Figure 4:
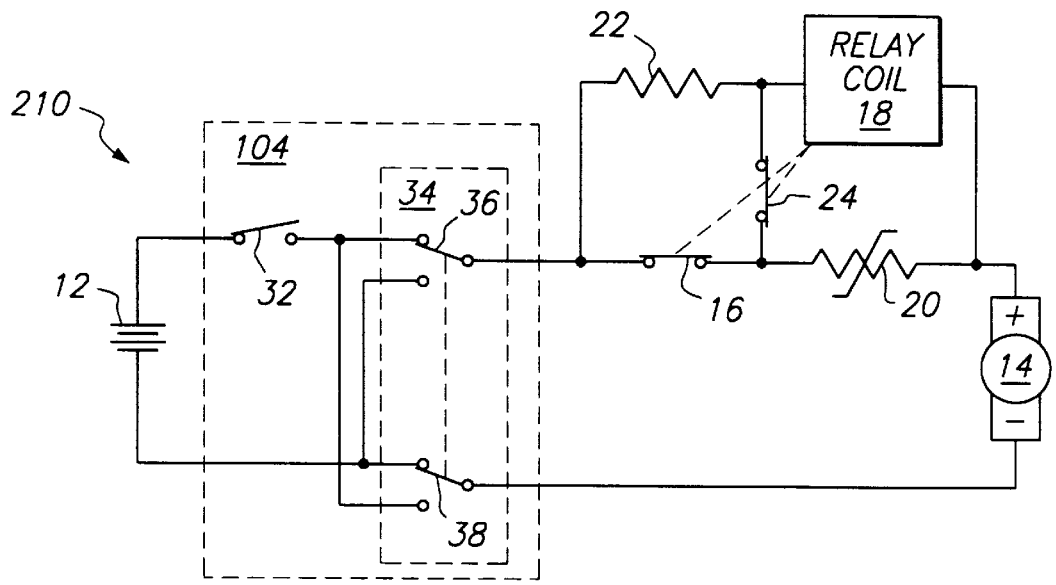

FIG. 4 is a circuit diagram of an example of a second embodiment of a second motor control circuit 210, which is suitable for controlling a motor operating in a binary mode, according to the first aspect of the invention. The second circuit 210 in FIG. 4 is similar to the first circuit 110 in FIG.

2. However, a resistor 22 is coupled between the output of the rocker switch 34 and the relay coil 18, and a second set of relay contacts 24 is coupled between the junction of the resistor 22 and relay coil 18 and the junction between the first set of relay contacts 16 and PTC 20. Both sets of relay contacts 16, 24 are coupled with and controlled by the relay coil 18. The large dashed box indicates the components in the second circuit 210 comprising the switch element 104.

Table 2 shows a correspondence between the operational elements of the embodiment shown in FIG. 3 and the circuit devices shown in FIG. 4. The control element 106 is again shown broken down into its constituent components, and the interrupt component 122 is broken down into its constituent circuit devices.

TABLE 2

| Operational Element | | | | Circuit Device | |
|---|---|---|---|---|---|
| Source | 102 | | | Battery | 12 |
| Switch Element | 104 | | | Power Switch | 32 |
| | | | | Rocker Switch | 34 |
| Control Element | 106 | Interrupt Component | 122 | Relay Contacts | 16 |
| | | | | Resistor | 22 |
| | | Sense Component | 124 | Relay Contacts | 24 |
| | | Control Component | 126 | PTC | 20 |
| | | | | Relay Coil | 18 |
| Load | | | | Motor | 14 |

In the second circuit 210 in FIG. 4, the second set of relay contacts 24 is used to switch resistor 22 in series with the relay coil 18 when the relay coil 18 is energized. When the relay coil 18 is de-energized, and both sets of relay contacts 16, 24 are closed, no current flows through the resistor 22. All the current flows through the parallel coupled relay coil 18 and PTC 20, with substantially all the current flowing through the PTC 20 due to its very low resistance. When the relay coil 18 is energized, the current flows through the resistor 22, through the relay coil 18 and through the motor 14. The resistance of the resistor 22 is selected so that, with both sets of contacts 16, 24 open, the voltage across the relay coil 18 is maintained above the drop-out voltage of the relay coil 18 to keep the relay coil 18 energized. The resistance of the resistor 22 will typically approximate that of the windings of the relay coil 18, so that the current in the second circuit 210 of FIG. 4 with the relay coil 18 energized will be approximately half the current in the first circuit 110 of FIG. 2 with the relay coil 18 energized.

Figure 5:
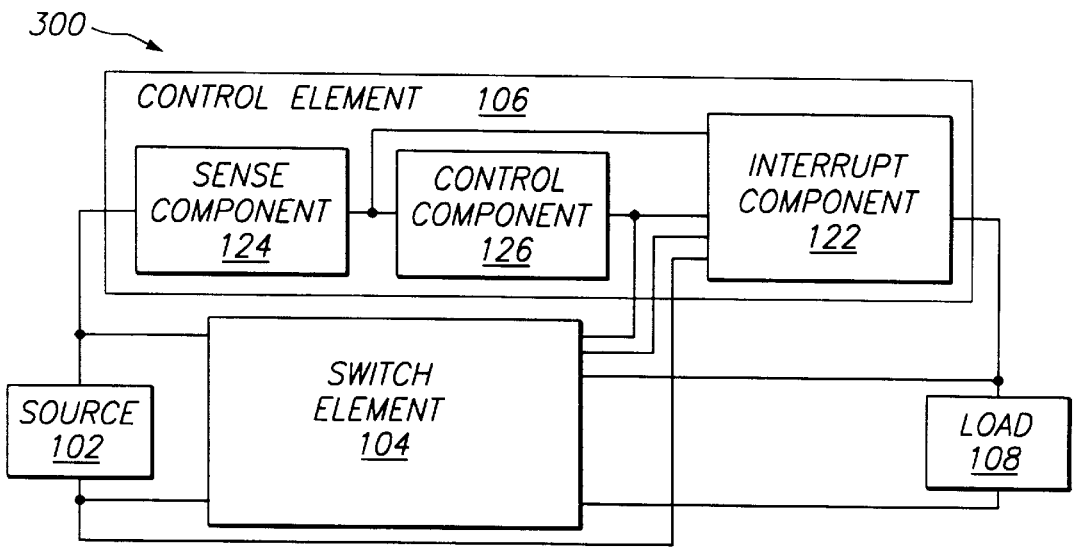
FIGS. 5, 7, 9, 11 and 13 show block diagrams depicting five embodiments of the operational elements of electric circuits suitable for controlling an electric motor in a hybrid application according to a first aspect of the invention.

FIG. 5 is a block diagram of an embodiment of a motor control circuit 300 suitable for controlling a motor operating in a hybrid mode according to the second aspect of the invention. In FIG. 5, the source 102 has a first output coupled to both an input of the sense component 124 and a first input of the switch element 104, and a second output coupled to both a second input of the switch element 104 and a first input of the interrupt component 122. The sense component 124 has an output which is coupled to both an input of the control component 126 and a second input of the interrupt component 122. The control component 126 has an output which is coupled to a third input of the interrupt component 122. The switch element 104 has a first output which is coupled to the third input of the interrupt component 122, a second output coupled to a fourth input of the interrupt component 122 and third and forth outputs coupled to an input and an output, respectively, of the load 108. The interrupt component 122 has an output which is coupled to the input of the load 108.

Figure 6:
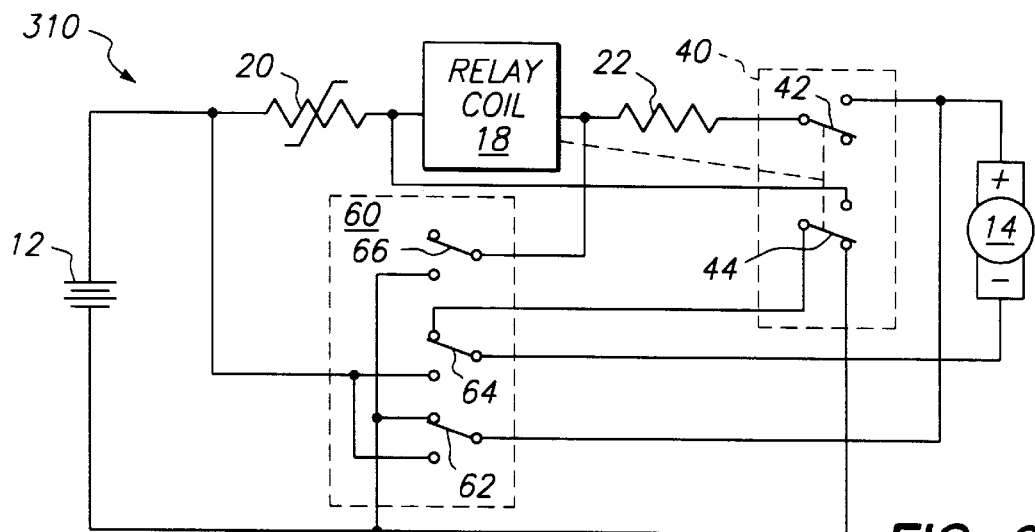
FIGS. 6, 8, 10, 12 and 14 show diagrams of example circuits corresponding to the block diagrams of FIGS. 5, 7, 9, 11 and 13, respectively, suitable for controlling an electric motor in a hybrid application according to a first aspect of the invention.

FIG. 6 is a circuit diagram of an example of an embodiment of a third motor control circuit 310, which is suitable for controlling a motor operating in a hybrid mode, according to the second aspect of the invention Table 3 shows a correspondence between the operational elements of the embodiment shown in FIG. 5 and the circuit devices shown in FIG. 6.

TABLE 3

| Operational Element | | | | Circuit Device | |
|---|---|---|---|---|---|
| Source | 102 | | | Battery | 12 |
| Switch Element | 104 | | | Switch Assy. | 60 |
| Control Element | 106 | Sense Component | 124 | PTC | 20 |
| | | Control Component | 126 | Relay Coil | 18 |
| | | Interrupt Component | 122 | Relay Contacts | 40 |
| | | | | Resistor | 22 |
| Load | 108 | | | Motor | 14 |

The switch assembly 60 comprises first, second and third switches 62, 64, 66. The switch assembly 60 functions as the switch element 104 of FIG. 5. The first switch 62 provides manual (analog) control in the positive direction, and the second switch 64 provides manual control in the negative direction. The third switch 66 provides a "one touch" automatic movement of the motor 14 to the full negative position. The third circuit 310 can be replicated or reconfigured to provide the same feature for automatic movement of the motor to the full positive position.

In its normally closed position, the first switch 62 couples the negative terminal of the battery 12 to the positive terminal of the motor 14. The negative terminal to the motor 14 is likewise coupled to the negative terminal of the battery 12 via the normally closed second switch 64 and normally closed second set of relay contacts 44. Hence, in a relaxed, normally closed state, both the positive and negative terminal of the motor 14 are coupled to the negative terminal of the motor.

The first and second switches 62, 64 are mechanically interconnected so that the movement of the first switch 62 is mutually exclusive with the movement of the second switch 64, i.e., only one of the first and second switches 62, 64 can be moved from the normally closed position to the normally open position at the same time. The third switch 66 is mechanically interconnected to the second switch 64 so that the movement of the third switch 66 is mutually inclusive of the movement of the second switch 64. This means that the third switch 66 can only be activated if the second switch 64 is already activated. However, the second switch 64 can be activated independently of the third switch 66.

When the first switch 62 is activated, the positive terminal of the motor 14 is coupled to the positive terminal of the battery 12, the negative terminal of the motor 14 is coupled to the negative terminal of the battery 12 through the second switch 64 and the second set of relay contacts 44, and the motor 14 rotates in the positive direction until the first switch 62 is de-activated.

When the second switch 64 is activated, the negative terminal of the motor 14 is coupled to the positive terminal of the battery 12, the positive terminal of the motor 14 is coupled to the negative terminal of the battery 12 through the first switch 62, and the motor 14 rotates in the negative direction until the second switch 64 is de-activated.

When the third switch 66 is activated, with the second switch 64 also activated, the relay coil 18 will be energized. The first set of relay contacts 42 on the relay provide a current path through the resistor 22 and the first switch 62 to "latch" the relay coil 18 energized. When the third switch 66 and the second switch 64 are released, the latched relay coil 18 will provide a connection from the negative terminal of the motor 14 through the second switch 64 and the second set of relay contacts 44 and the PTC 22 to the positive terminal of the battery 12. The positive terminal of the motor 14 is coupled to the negative terminal of the battery 12 through the first switch 62, and the motor continues to travel in the negative direction until end of travel is reached, or the first switch 62 is momentarily activated (which causes the relay coil 18 to de-energize and unlatch). If, after the third switch 66 is activated and the motor 14 is allowed to travel to the full negative position, the motor 14 will be forced to stop at the end of travel and the motor will momentarily stall. The stall current will cause the series PTC 20 to heat and increase in resistance. Once the resistance increases to the point where the voltage across the relay coil 18 has fallen below the "drop out" level of the relay coil 18, the relay coil 18 will de-energize, de-activating both sets of relay contacts 42, 44, and interrupting current to the motor 14. Since current flow through the PTC 20 is removed immediately, the "soft" tripping nature of the operation virtually eliminates the typical trip endurance and cycle life issues with PPTCs.

Figure 7:
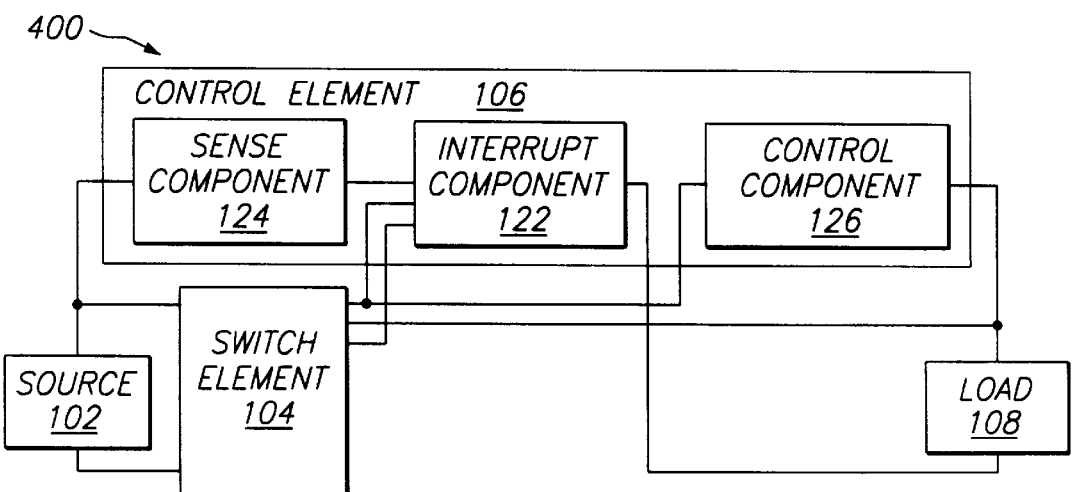

FIG. 7 is a block diagram of an embodiment of a motor control circuit 400 suitable for controlling a motor operating in a hybrid mode according to the second aspect of the invention. The embodiment of a motor control circuit 400 in FIG. 7 differs from the circuit 300 depicted in FIG. 5 in that the sense component 124 is not directly coupled with the control component 126; the control component 126 has an output coupled with the load 108. In FIG. 7, the source 102 has a first output coupled to both an input of the sense component 124 and a first input of the switch element 104, and a second output coupled to a second input of the switch element 104. The sense component 124 has an output which is coupled a first input of the interrupt component 122. The switch element 104 has a first output coupled to both an input of the control component 126 and a second input of the interrupt component 122, and a second output coupled to an input of the load 180, and a third output coupled to a third input of the interrupt component 122. The interrupt component 122 has an output which is coupled to an output of the load 108. The control component 126 has an output which is coupled to the input of the load 108.

Figure 8:
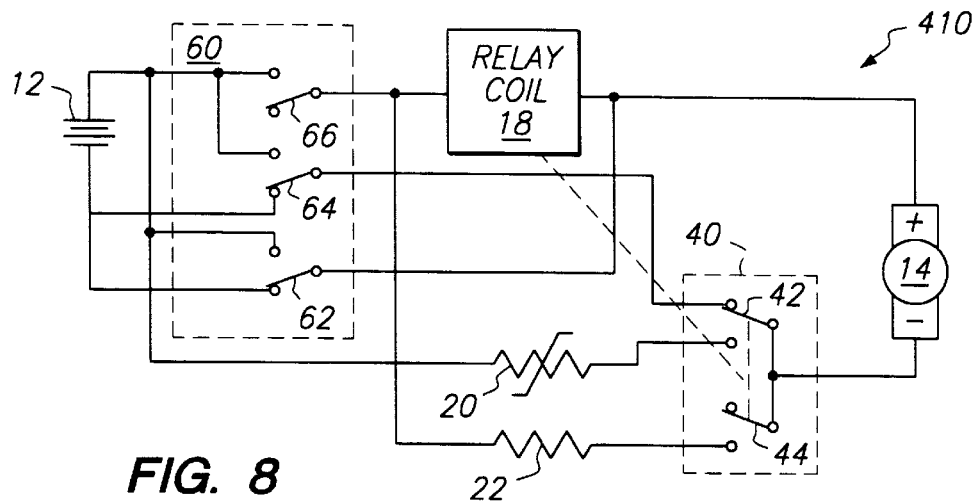

FIG. 8 is a circuit diagram of an example of an embodiment of a fourth motor control circuit 410, which is suitable for controlling a motor operating in a hybrid mode, according to the second aspect of the invention. Table 4 shows a correspondence between the operational elements of the embodiment shown in FIG. 7 and the circuit devices shown in FIG. 8.

TABLE 4

| Operational Element | | | | Circuit Device | |
|---|---|---|---|---|---|
| Source | 102 | | | Battery | 12 |
| Switch Element | 104 | | | Switch Assy. | 60 |
| Control Element | 106 | Sense Component | 124 | PTC | 20 |
| | | Control Component | 126 | Relay Coil | 18 |

TABLE 4-continued

| Operational Element | | | | Circuit Device | |
|---|---|---|---|---|---|
| | | Interrupt Component | 122 | Relay Assy. | 40 |
| | | | | Resistor | 22 |
| Load | 108 | | | Motor | 14 |

The operation of the fourth motor control circuit 410 shown in FIG. 8 is similar to the operation of the third circuit 310 in FIG. 6. The switch assembly 60 functions as the switch element 104 of FIG. 7. The wiring configuration of the relay assembly 40 and the switch assembly 60 are configured so that the negative terminal of the motor 14 is coupled to the common terminals of the relay contacts 42, 44 and then through the common terminal of the second switch 64. This configuration allows the reuse of the "hard wired" portion of an existing switch and change only the printed circuit board portion of the switch. This circuit is otherwise functionally the same as the third circuit 310 in FIG. 6.

Figure 9:
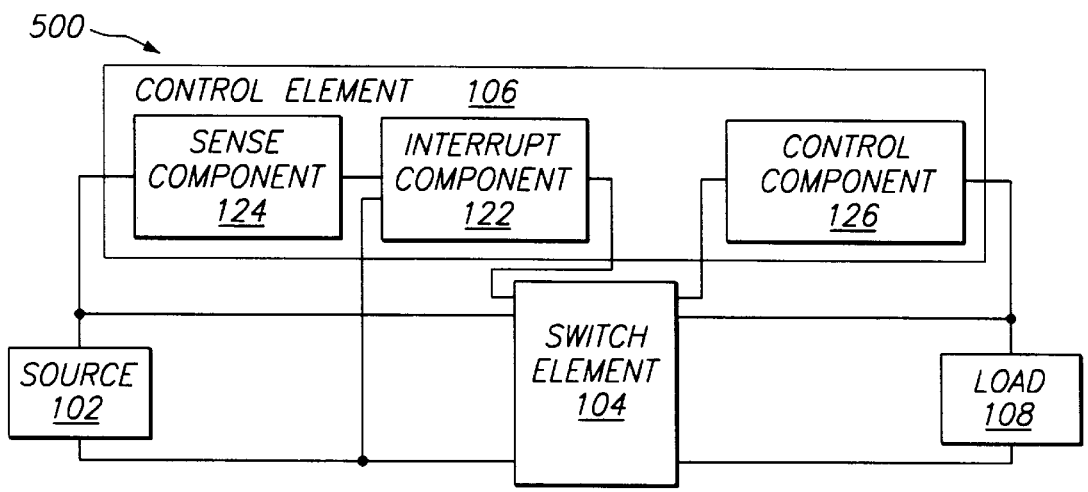

FIG. 9 is a block diagram of an embodiment of a motor control circuit 500 suitable for controlling a motor operating in a hybrid mode according to the second aspect of the invention. The embodiment of a motor control circuit 500 in FIG. 9 differs from the circuit 300 depicted in FIG. 5 in that the sense component 124 is not directly coupled with the control component 126; the control component 126 has an output coupled with the load 108. In FIG. 9, the source 102 has a first output coupled to both an input of the sense component 124 and a first input of the switch element 104, and a second output coupled to both a second input of the switch element 104 and a first input of the interrupt component 122. The sense component 124 has an output which is coupled a second input of the interrupt component 122. The interrupt component 122 has an output which is coupled to a third input of the switch element 104. The switch element 104 has a first output coupled to an input of the control component 126, and second and third outputs coupled to an input and output, respectively, of the load 108. The control component 126 has an output which is coupled to the input of the load 108.

Figure 10:
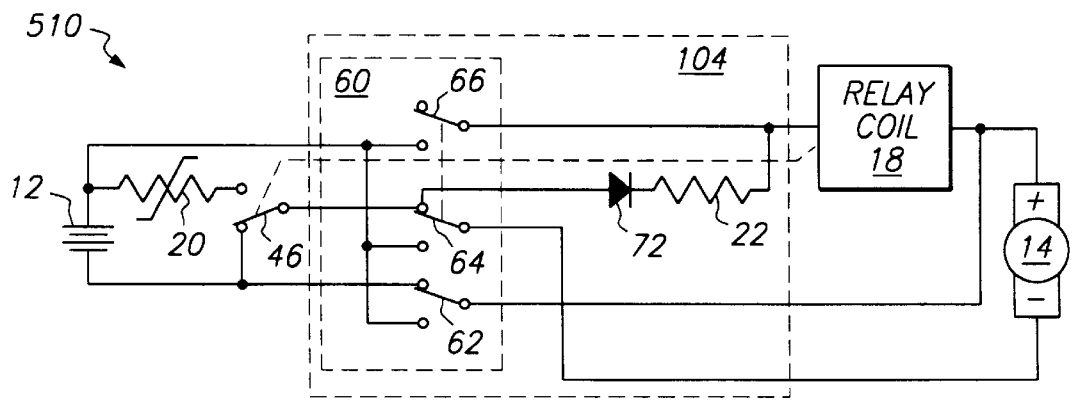

FIG. 10 is a circuit diagram of an example of an embodiment of a fifth motor control circuit 510, which is suitable for controlling a motor operating in a hybrid mode, according to the second aspect of the invention. Table 5 shows a correspondence between the operational elements of the embodiment shown in FIG. 9 and the circuit devices shown in FIG. 10. The large dashed box indicates the components in the fifth motor control circuit 510 comprising the switch element 104.

TABLE 5

| Operational Element | | | | Circuit Device | |
|---|---|---|---|---|---|
| Source | 102 | | | Battery | 12 |
| Switch Element | 104 | | | Switch Assy. | 60 |
| | | | | Resistor | 22 |
| | | | | Diode | 72 |
| Control Element | 106 | Sense Component | 124 | PTC | 20 |
| | | Control Component | 126 | Relay Coil | 18 |
| | | Interrupt Component | 122 | Relay Contacts | 46 |
| Load | 108 | | | Motor | 14 |

The operation of the fifth circuit 510 in FIG. 10 is similar to the operation of the third circuit 310 in FIG. 6 and the fourth circuit 410 in FIG. 8, with the primary difference being that the fifth circuit 510 in FIG. 10 uses a lower cost single pole double throw relay 46. However, to use the lower cost relay, the fifth circuit 510 requires the addition of a low cost rectifying diode 72 (1N4001 or equivalent). The operation of the first switch 62, the second switch 64 and the third switch 66 is as described in the description for the third circuit 310 in FIG. 6. When the third switch 66 is activated (the second switch 64 will also be activated), the relay coil 18 will be energized. The current flows from the third switch 66 through the relay coil 18 and to the negative terminal of the battery 12 through the first switch 62. Once energized, the relay 46 becomes "latched" by obtaining power from the positive terminal of the battery 12 through the relay 46, through the diode 72 and through the resistor 22. The relay coil 18 can be unlatched (de-energized) by momentarily activating the first switch 62, which removes the coupling of the relay coil 18 to the negative terminal of the battery 12. The diode prevents the relay coil 18 from becoming energized when the first switch 62 is activated. If the first switch 62 is not activated while the relay 18 is latched in the energized position, then the motor 14 continues to travel until it reaches the full negative position, and the operation continues as described in the description of the third circuit 310 in FIG. 6.

Figure 11:
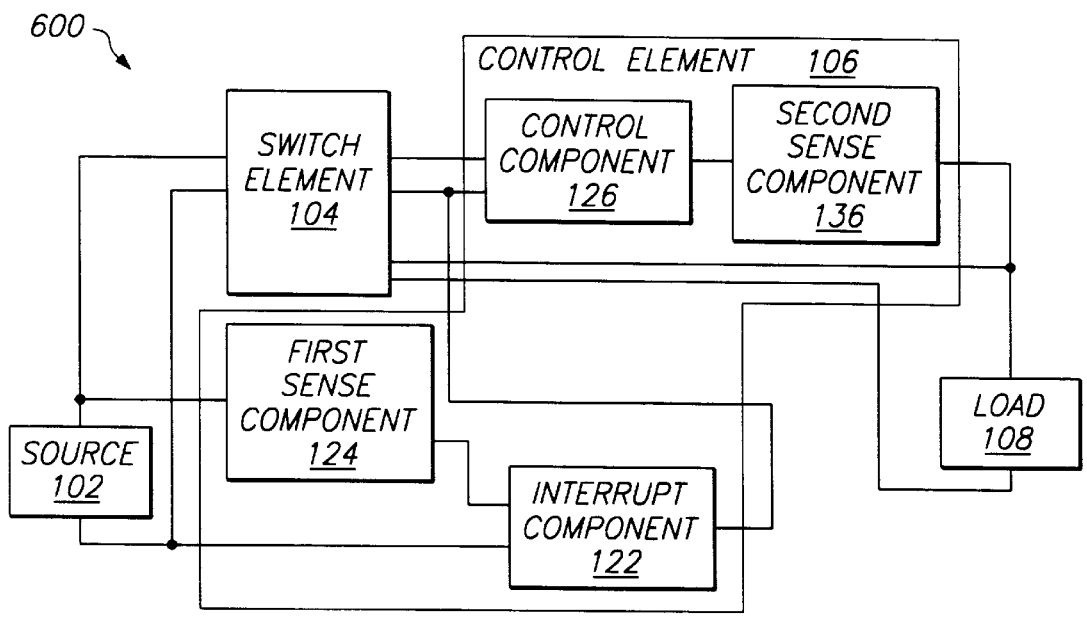

FIG. 11 is a block diagram of an embodiment of a motor control circuit 600 suitable for controlling a motor operating in a hybrid mode according to the second aspect of the invention. The embodiment of a motor control circuit 600 in FIG. 11 differs from the circuit 500 depicted in FIG. 9 in that a second sense component 136 is coupled in series between the control component 126 and the load 108. In FIG. 11, the source 102 has a first output coupled to both an input of the first sense component 124 and a first input of the switch element 104, and a second output coupled to both a second input of the switch element 104 and a first input of the interrupt component 122. The switch element 104 has a first and second output coupled to a first and second input, respectively, of the control component 126, and third and forth outputs coupled to an input and output, respectively, of the load 108. The first sense component 124 has an output which is coupled to the second input of the interrupt component 122. The interrupt component 122 has an output coupled to the second input of the control component 126. The control component 126 has an output which is coupled to an input of the second sense component 136. The second sense component 136 has an output which is coupled to the input of the load 108.

Figure 12:
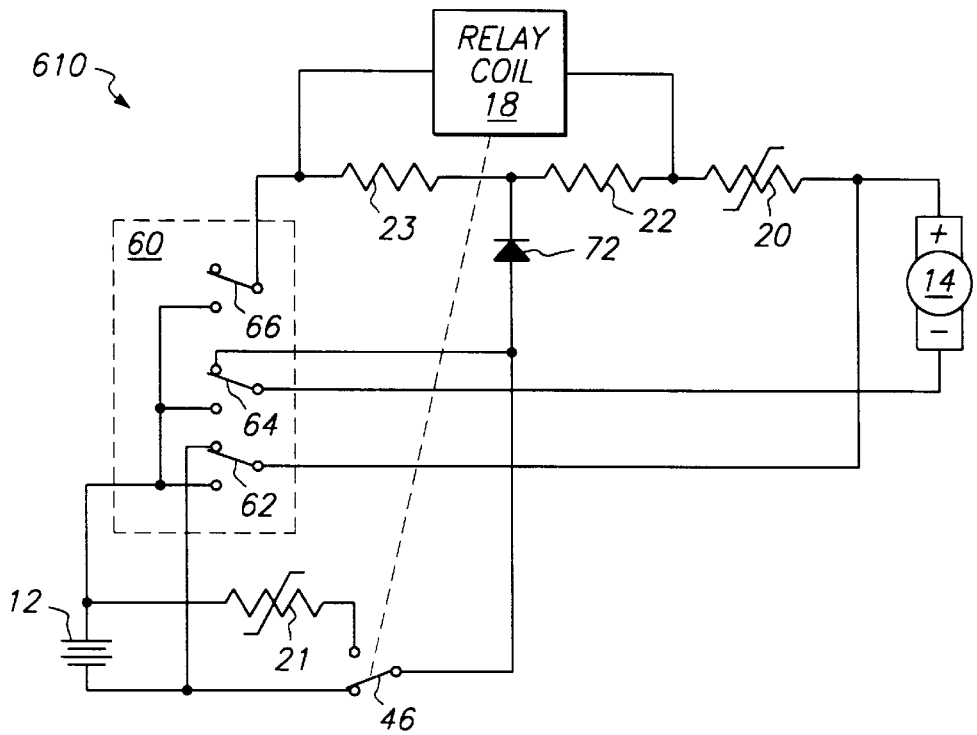

FIG. 12 is a circuit diagram of an example of an embodiment of a sixth motor control circuit 610, which is suitable for controlling a motor operating in a hybrid mode, according to the second aspect of the invention. Table 6 shows a correspondence between the operational elements of the embodiment shown in FIG. 11 and the circuit devices shown in FIG. 12. The large dashed box indicates the components in the sixth motor control circuit 610 comprising the switch element 104.

TABLE 6

| Operational Element | | | | Circuit Device | |
|---|---|---|---|---|---|
| Source | 102 | | | Battery | 12 |
| Switch Element | 104 | | | Switch Assy. | 60 |
| Control Element | 106 | Sense Component | 124 | PTC | 21 |

TABLE 6-continued

| Operational Element | | | | Circuit Device | |
|---|---|---|---|---|---|
| | | Second Sense Component | 136 | PTC | 20 |
| | | | | Relay Coil | 18 |
| | | Control Component | 126 | Relay | 46 |
| | | Interrupt Component | 122 | Contacts | |
| | | | | Resistor | 22 |
| | | | | Resistor | 23 |
| | | | | Diode | 72 |
| Load | 108 | | | Motor | 14 |

The operation of the sixth motor control circuit 610 in FIG. 12 is similar to the operation of the fifth circuit 510 in FIG. 10, with the addition of a "time out" feature. Two additional components, a second PTC 20 and a second resistor 22, provide a time-out mechanism to unlatch the relay coil 18 in the event the motor linkage should become damaged which could result in the motor 14 never reaching a stall condition. The second PTC 20 is coupled in series with the relay coil 18 and the second resistor 22 is coupled in parallel with the relay coil 18. The second resistor 22 increases the current flow through the second PTC 20 in order to cause the second PTC 20 to trip within a predetermined time. The time to trip for the combination of the second PTC 20 and the second resistor 22 is set to be longer than the normal time the motor 14 takes to reach the end of travel stall condition.

Figure 13:
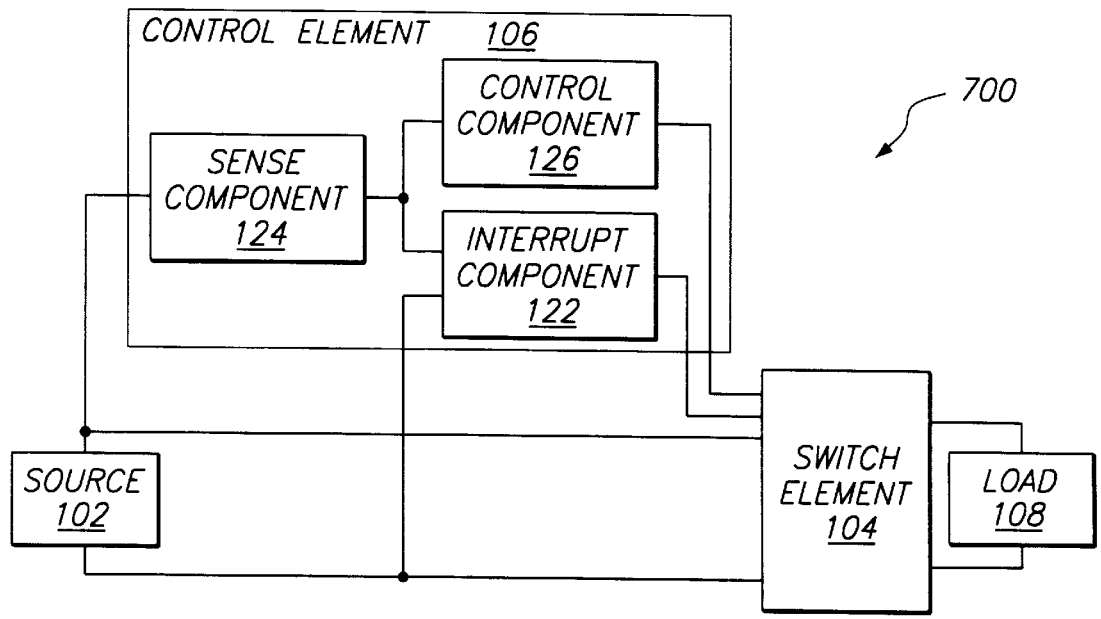

FIG. 13 is a block diagram of an embodiment of a motor control circuit 700 suitable for controlling a motor operating in a hybrid mode according to the second aspect of the invention. In FIG. 13, the source 102 has a first output coupled with both an input of the sense component 124 and a first input of the switch element 104, and a second output coupled to both a second input of the switch element 104 and a first input of the interrupt component 122. The sense component has an output coupled to both an input of the control component 126 and a second input of the interrupt component 122. The control component 126 has an output coupled to a third input of the switch element 104. The interrupt component 122 has an output coupled to a forth input of the switch element 104. The switch element 104 has a first and second output coupled to an input and output, respectively, of the load 108.

Figure 14:
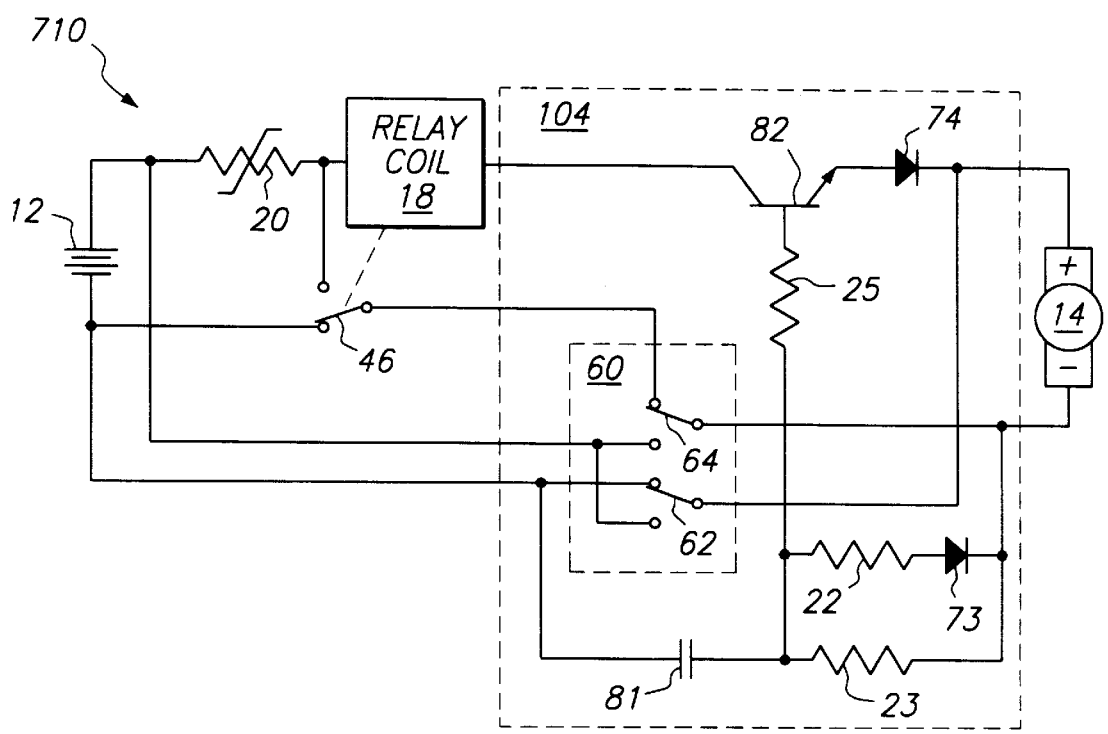

FIG. 14 is a circuit diagram of an example of an embodiment of a seventh motor control circuit 710, which is suitable for controlling a motor operating in a hybrid mode, according to the second aspect of the invention. Table 7 shows a correspondence between the operational elements of the embodiment shown in FIG. 13 and the circuit devices shown in FIG. 14. The large dashed box indicates the components in the seventh motor control circuit 710 comprising the switch element 104.

TABLE 7

| Operational Element | | Circuit Device | |
|---|---|---|---|
| Source | 102 | Battery | 12 |
| Switch Element | 104 | Switch Assy. | 60 |
| | | Transistor | 82 |
| | | Diode | 74 |
| | | Resistor | 25 |
| | | Resistor | 22 |

TABLE 7-continued

| Operational Element | | | | Circuit Device | |
|---|---|---|---|---|---|
| | | | | Resistor | 23 |
| | | | | Diode | 73 |
| | | | | Capacitor | 81 |
| Control Element | 106 | Sense Component | 124 | PTC | 20 |
| | | Control Component | 126 | Relay Coil | 18 |
| | | Interrupt Component | 122 | Relay Contacts | 46 |
| Load | 108 | | | Motor | 14 |

In the seventh motor control circuit 710, the one touch feature of the circuit is activated by holding a switch for a predetermined period of time. The third switch 66 illustrated in FIGS. 6, 8, 10 and 12 is replaced by a transistor 82 coupled in the line between the relay coil 18 and the positive terminal of the motor 14. Supporting electronics include: a first diode 74 coupled between the transistor 82 and the positive terminal of the motor 14; a first resistor 25 having a first terminal coupled to the base of the transistor 82; a capacitor 81 coupled between the negative terminal of the battery 12 and a second terminal of the first resistor 25; a second resistor 22 and a second diode 73 coupled in series and coupled between the second terminal of the first resistor 25 and the negative terminal of the motor 14; and a third resistor 23 coupled between the second terminal of the first resistor 25 and the negative terminal of the motor 14. The center contact of the first switch 62 is coupled to the positive terminal of the motor 14, and the center contact of the second switch 64 is coupled to the negative terminal of the motor 14.

If the second switch 64 is held for the predetermined period of time (based on an RC time constant determined by the values of the third resistor 23 and the capacitor 81) the transistor 82 turns on and provides a path for current to flow to energize the relay coil 18. Once the relay coil 18 is energized, and the second switch 64 has been released, the relay contacts 46 keep the positive terminal of the battery 12 coupled to the negative terminal of the motor 14. This coupling also maintains the current flow to the base of the transistor 82, thereby latching the relay coil 18 in the energized state. The second resistor 22 and second diode 73 provide a discharge path for the capacitor 81. The first diode 74 blocks current flow to prevent the relay coil 18 from energizing when the first switch 62 is activated.

The foregoing detailed description of the invention includes passages which are chiefly or exclusively concerned with particular parts or aspects of the invention. It is to be understood that this is for clarity and convenience, that a particular feature may be relevant in more than just the passage in which it is disclosed, at that the disclosure herein includes all the appropriate combinations of information found in the different passages. Similarly, although the various figures and descriptions herein relate to specific embodiments of the invention, it is to be understood that where a specific feature is disclosed in the context of a particular figure, such feature can also be used, to the extent appropriate, in the context of another figure, in combination with another feature, or in the invention in general.

Further, while the present invention has been particularly described in terms of certain preferred embodiments, the invention is not limited to such preferred embodiments. Rather, the scope of the invention is defined by the appended claims.

I claim:

1. A motor position control arrangement for coupling between an electric power source and a bidirectional direct current electric motor for operating an apparatus, the power source having a positive output and a negative output, the motor having a positive input, a negative input, the apparatus having a full extended position and a full retracted position, the control arrangement comprising:
   a. a control element, in use coupled in series with the motor, the control element comprising
      (1) an interrupt component having a closed state in which it can carry a normal circuit current and an open state in which it can carry at most a reduced circuit current, including no current, and
      (2) a sense component comprising means for sensing, when the motor rotates from one of the full extended position or the full retracted position to the other of the full extended position or the full retracted position, when the apparatus reaches said other position, and
      (3) a control component comprising means for changing the interrupt component from the closed state to the open state when the sense component senses that the apparatus has reached said other position;
      (4) the interrupt component and sense component being coupled as a series combination and the series combination being coupled in parallel with the control component, and
   b. a switch element, in use comprising
      (1) means for coupling
         (i) the positive output of the power source with the positive input of the motor, and
         (ii) the negative output of the power source with the negative input of the motor, and, alternatively
      (2) means for coupling
         (i) the positive output of the power source with the negative input of the motor, and
         (ii) the negative output of the power source with the positive input of the motor;
      wherein,
   A. with the apparatus in the full extended position, the interrupt component in the closed state, and the switch element coupling the positive output of the power source with the negative input of the motor and the negative output of the power source with the positive input of the motor, the motor rotating to move the apparatus to the full retracted position, wherein the control component, upon the sense element sensing that the apparatus has reached the full negative position, causing the interrupt component to change from the closed state to the open state, thereby removing power from the motor, and
   B. with the motor in the full negative position, the interrupt component in the closed state, and the switch element coupling the positive output of the power source with the positive input of the motor and the negative output of the power source with the negative input of the motor, the motor rotating to move the apparatus to the full extended position, wherein the control component, upon the sense element sensing that the apparatus has reached the fill extended position, causing the interrupt component to change from the closed state to the open state, thereby removing power from the motor.

2. An arrangement according to claim 1, wherein the switch element comprises means to disconnect the power source from the electric motor.

3. An arrangement according to claim 1, wherein:
  a. the sense component comprises a positive temperature coefficient (PTC) device having a low resistance state and a high resistance state;
  b. the control component comprises a relay coil; and
  c. the interrupt component comprises a set of relay contacts coupled with the relay coil;
wherein, with the motor rotating from one of the full extended position or the full retracted position to the other of the full extended position or the full retracted position, the current drawn by the motor increasing and causing the PTC device to trip from its low resistance state to its high resistance state, thereby increasing the voltage across the PTC device and the relay coil, the relay coil energizing when said voltage reaches a predetermined voltage level, the energized relay coil thereby opening the relay contacts and interrupting the current through the PTC device and the motor.

4. An arrangement according to claim 1, wherein
  a. the interrupt component comprises an input, a first output and a second output;
  b. the sense component comprises an input and an output; and
  c. the control component comprises an input and an output;
wherein,
  (i) the sense component input is coupled to the first output of the interrupt component,
  (ii) the control component input is coupled to the second output of the interrupt component, and
  (iii) the output of the sense component is coupled to the output of the control component.

5. An arrangement according to claim 4, wherein
  a. the interrupt component comprises
    (i) a resistor coupled between the interrupt component input and the first interrupt component output,
    (ii) a first set of relay contacts coupled between the interrupt component input and the second interrupt component output, and
    (iii) a second set of relay contacts coupled between the first interrupt component output and the second interrupt component output;
  b. the control component comprises a relay coil coupled with
    (i) the first set of relay contacts, and
    (ii) the second set of relay contacts; and
  c. the sense component comprises a PTC device.

6. An electric circuit comprising a direct current electric power source, a bidirectional direct current electric motor and a bidirectional motor rotation control arrangement coupled between the electric power source and the electric motor, the power source having a positive output and a negative output, the motor having a positive input, a negative input, a full forward rotational position and a full reverse rotational position, the control arrangement comprising:
  a. a control element, coupled in series with the motor, the control element comprising
    (1) an interrupt component having a closed state in which it can carry a normal circuit current and an open state in which it can carry at most a reduced circuit current, including no current, and
    (2) a sense component comprising means for sensing, when the motor rotates from one of the full positive position or the full negative position to the other of the full positive position or the full negative position, when the motor reaches said other position, and
    (3) a control component comprising means for changing the interrupt component from the closed state to the open state when the sense component senses that the motor has reached said other position; wherein
    (4) the interrupt component and sense component are coupled as a series combination, and the series combination is coupled in parallel with the control component; and
  b. a switch element, comprising
    (1) means for coupling
      (i) the positive output of the power source with the positive input of the motor, and
      (ii) the negative output of the power source with the negative input of the motor, and, alternatively
    (2) means for coupling
      (i) the positive output of the power source with the negative input of the motor, and
      (ii) the negative output of the power source with the positive input of the motor;
wherein,
  A. with the motor in the full forward rotational position, the interrupt component in the closed state, and the switch element coupling the positive output of the power source with the negative input of the motor and the negative output of the power source with the positive input of the motor, the motor rotating to the full reverse rotational position, wherein the control component, upon the sense element sensing that the motor has reached the full reverse rotational position, causing the interrupt component to change from the closed state to the open state, thereby removing power from the motor, and
  B. with the motor in the full reverse rotational position, the interrupt component in the closed state, and the switch element coupling the positive output of the power source with the positive input of the motor and the negative output of the power source with the negative input of the motor, the motor rotating to the full forward rotational position, wherein the control component, upon the sense element sensing that the motor has reached the full forward rotational position, causing the interrupt component to change from the closed state to the open state, thereby removing power from the motor.

7. An arrangement according to claim 6, wherein:
  a. the sense component comprises a positive temperature coefficient (PTC) device having a low resistance state and a high resistance state;
  b. the control component comprises a relay coil responsive to a predetermined relay actuation voltage; and
  c. the interrupt component comprises a set of normally closed relay contacts opened by the relay coil;
wherein, when the motor reaches one of the full forward rotational position and the full reverse rotational position, the current drawn by the motor thereupon increases and causes the PTC device to trip from its low resistance state to its high resistance state, thereby increasing a voltage across the PTC device and the relay coil, the relay coil opening said set of relay contacts when said voltage reaches the predetermined relay actuation voltage, the energized relay coil thereby opening the relay contacts and interrupting the current through the PTC device and the motor.

8. An arrangement according to claim 6, wherein
  a. the interrupt component comprises an input, a first output and a second output;

b. the sense component comprises an input and an output; and c. the control component comprises an input and an output;

wherein, (i) the sense component input is coupled to the first output of the interrupt component, (ii) the control component input is coupled to the second output of the interrupt component, and (iii) the output of the sense component is coupled to the output of the control component.

9. An arrangement according to claim 8, wherein a. the interrupt component comprises (i) a resistor coupled between the interrupt component input and the first interrupt component output, (ii) a first set of relay contacts coupled between the interrupt component input and the second interrupt component output, and (iii) a second set of relay contacts coupled between the first interrupt component output and the second interrupt component output;

b. The control component comprises a relay coil coupled with (i) the first set of relay contacts, and (ii) the second set of relay contacts; and c. the sense component comprises a PTC device.

10. An arrangement according to claim 6 wherein the switch element comprises a single pole, single throw power switch in series between one terminal of the power source and first predetermined parallel-connected contacts of a double pole, double throw switch, another terminal of the power source being connected to second predetermined parallel-connected contacts of the double pole, double throw switch.

11. An arrangement according to claim 10 wherein electric power source comprises a vehicle battery, the electric motor operates a vehicle window apparatus, and wherein the double pole, double throw switch comprises a rocker switch.

12. An arrangement according to claim 6 wherein the switch element includes a timeout circuit for disconnecting the electric motor from the electric power source following a predetermined motor energization interval related to a time needed for the motor to rotate between the full forward rotational position and the full reverse rotational position.

13. An arrangement according to claim 6 wherein the switch element includes latching means responsive to holding a switch for a predetermined period of time for maintaining coupling of the power source to the motor until one of the full forward rotational position or full reverse rotational position is reached.

* * * * *